Patented Oct. 16, 1951

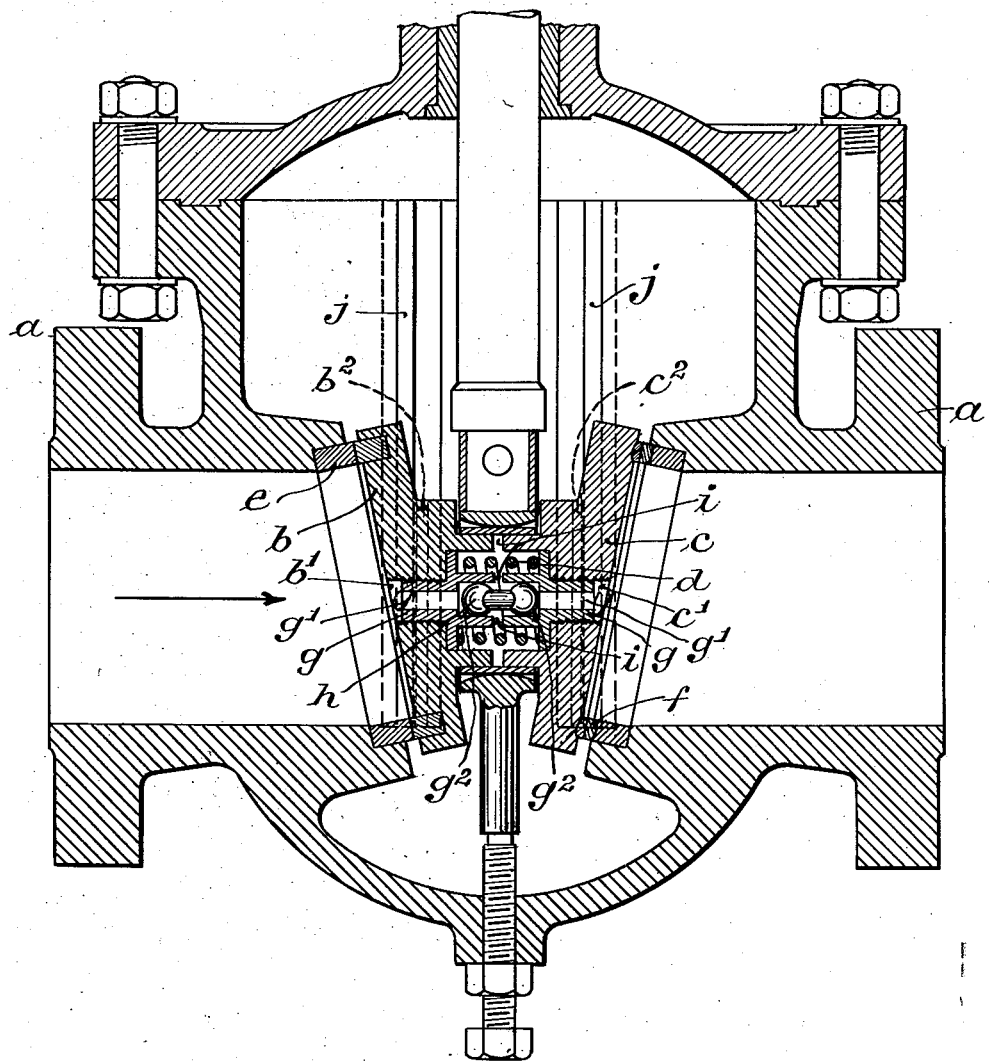

2,571,826

UNITED STATES PATENT OFFICE 2,571,826

VALVE FOR CONTROLLING THE FLOW OF GASEOUS OR LIQUID MEDIA

William Boyd, Brighouse, England, assignor to J. Blakeborough & Sons, Limited, Brighouse, England Application March 12, 1947, Serial No. 734,172
In Great Britain June 14, 1946

3 Claims. (Cl. 251—65)

The invention relates to valves, for controlling the flow of gaseous or liquid media of what are known as the split wedge type, that is to say in which the stopper is in the form of two doors or members forming a wedge and urged apart, that is to say into contact with respective valve faces, by a coiled spring located between them.

A valve of the type referred to, according to the present invention, is characterised by the provision of an automatic valve arrangement by means of which, when the valve is in the closed position, the space within the valve body is always in communication with the upstream or pressure side of the valve. Building up of regenerated pressure within the valve body is thus prevented and the upstream or inlet pressure of the medium being controlled is utilised to assist in holding the downstream door tightly against its seat. A further characteristic feature is the provision of guides on or carried by the valve body and so arranged that as immediate upward movement of the valve spindle commences, to open the valve, the doors are drawn out of contact with their seats and the load is carried by the guides.

The relevant parts of a valve according to the invention are shown in sectional elevation in the accompanying drawing to which, in describing the invention, reference will be made.

In the drawing, $a$ represents the valve body, and $b$ and $c$ the two door members urged by a spring $d$ into contact with respective seat faces $e$ and $f$ carried by the body.

The faces $e$ and $f$ are, as shown, inclined to the longitudinal axis of the valve and the door members $b$ and $c$ form between them a wedge-shaped stopper.

Each door member has a central opening $b'$ or $c'$ formed through it and into each of such openings there is screwed, from the inner side, a nipple member $g$ having a central passage $g'$, the inner end portion $g^2$ of which is enlarged in diameter. Between the two members $g$ there is disposed a dumb-bell valve $h$, the ends of which are slidable in the enlarged diameter portions $g^2$ of the passages $g'$ and are adapted to seat themselves against the inner ends of said passages and thus close them against passage of the medium under control.

The valve member $h$ is somewhat shorter than the distance between the inner ends of the passages $g'$. Assuming flow through the valve to be in the direction of the arrow A, pressure medium from the upstream side of the valve enters through the passage $g'$ in the valve member $b$ and moves the valve member $h$ longitudinally to close the passage through the door member $c$. The medium thus has access, through ports $i$, to the space between the valve members and thus to the interior of the valve body, with the result that the door member $c$ is forced tightly against its seat.

A valve spindle has an eye part which encircles the inner ends of the door members $b$ and $c$, and on the valve body there are provided vertical guide strips $j$ which engage strips or projections $b^2$ and $c^2$ on the door members $b$ and $c$. Thus, as the valve spindle moves upwardly, the door members $b$ and $c$ are, by reason of the engagement of their strips or projections $b^2$ and $c^2$ with the guide strips $j$, drawn out of contact with the seat faces $e$ and $f$; the guide strips instead of the faces of the valve members receive the friction producing thrust caused by the spring $d$.

Having thus described my invention, what I claim as new and desire to secure by Letters Patent is:

1. In a control valve having a valve body provided with an internal valve chamber and an upstream and a downstream conduit, respectively, extending from opposite sides into the valve chamber to form valve openings, in combination two valve seats spaced apart in said valve body and respectively disposed at the inner opposite ends of the two conduits; two valve closure members respectively disposed adjacent to said two valve seats and each being movable toward one of the latter to effect closure of the respectively adjacent valve seat; valve operating means operatively connected to both of the valve closure members for simultaneously moving the latter between a closed position seated on said two valve seats and an open position off said valve seats and back again, each of said two valve closure members being formed with a passage extending therethrough and communicating with one of the valve conduits and with the valve chamber; a pair of tubular members each having opposite open ends and each being connected to one of said valve closure members with the openings in said tubular members respectively communicating with the passages of said valve closure members, said tubular members each having an end portion located opposite to an end portion of the other tubular member and located in said valve chamber, and each tubular member having a first inner diameter in said end portion thereof which is of a larger size than a second inner diameter in the remainder thereof so as to form a shoulder in said tubular members which faces the interior of said valve chamber; and an elongated double valve member having opposite end portions and a central portion located between said end portions thereof, said end portions of said double valve member being at least as thick as said central portion thereof and being of a smaller thickness than said first inner diameter of said tubular members and of a larger thickness than said second inner diameter of said tubular members, said double valve member being of a greater length than the distance between said end portions of said tubular members and of a shorter length than the distance between said shoulders of said tubular members and being located within said end portions of said tubular members, whereby, when said valve closure members are in closed position, fluid pressure in the upstream conduit acts on one end portion of said double valve member to move the other end portion of said double valve member into sealing engagement with the shoulder of said tubular member associated with the downstream conduit so that the interior of said valve chamber is in communication with said upstream conduit.

2. In a control valve having a valve body provided with an internal valve chamber and an upstream and a downstream conduit extending from opposite sides into the valve chamber to form valve openings, in combination two valve seats spaced apart in said valve body and disposed respectively at the inner opposite ends of the two conduits; two valve closure members respectively disposed adjacent to said two valve seats and each being movable toward one of the latter to effect closure of the respectively adjacent valve seat; valve operating means operatively connected to both of the valve closure members for simultaneously moving the latter between a closed position seated on said two valve seats and an open position off said valve seats and back again, each of said two valve closure members being formed with a cylindrical bore extending therethrough and communicating with one of the valve conduits and with the valve chamber, a pair of tubular members each arranged in the bore of one of said closure members, and each having a first cylindrical portion mounted in one of said bores and formed with a first cylindrical passage therein, and a second cylindrical portion projecting into said valve chamber and formed with a second cylindrical passage of greater diameter than said first cylindrical passage in said first cylindrical portion and being coaxial therewith whereby an inner shoulder is formed in each of said tubular members facing the interior of said valve chamber and serving as a valve seat, the second cylindrical portions of said pair of tubular members being located coaxially with each other in the valve chamber so that said second cylindrical passages form a cylindrical guide way; and an elongated double valve member having a length shorter than the distance between said shoulders in said tubular members and having on either end a spherical end portion of a smaller diameter than the diameter of said second passage, and of a larger diameter than the diameter of said first cylindrical passages, said double valve member being located in said cylindrical guide way formed by said second cylindrical passages of said pair of tubular members, whereby, when said closure members are in said closing position, the fluid in the upstream conduit bearing against one of the spherical end portions of said elongated double valve member moves said double valve member with its other spherical end portion into sealing engagement with said valve seat in the tubular member associated with the downstream conduit so that the internal valve chamber is in communication with the upstream conduit to permit excess pressure in the internal valve chamber to escape to the upstream conduit.

3. A control valve having a valve body provided with an internal valve chamber and an upstream and a downstream conduit extending from opposite sides into the valve chamber to form valve openings, in combination two valve seats spaced apart in said valve body and disposed respectively at the inner opposite ends of the two conduits; two valve closure members respectively disposed adjacent to said two valve seats and each being movable toward one of the latter to effect closure of the respectively adjacent valve seat; valve operating means operatively connected to both of the valve closure members for simultaneously moving the latter between a closed position seated on said two valve seats and an open position off said valve seats and back again, each of said two valve closure members being formed with a cylindrical bore extending therethrough and communicating with one of the valve conduits and with the valve chamber; spring means mounted between said two valve closure members and urging the latter apart towards said valve seats so as to simultaneously seat closure members therein; a pair of tubular members each arranged in the bore of one of said closure members, and each having a first cylindrical portion mounted in one of said bores and formed with a first cylindrical passage therein, and a second cylindrical portion projecting into said valve chamber and formed with a second cylindrical passage of greater diameter than said first cylindrical passage in said first cylindrical portion and being coaxial therewith whereby an inner shoulder is formed in each of said tubular members facing the interior of said valve chamber and serving as a valve seat, the second cylindrical portions of said pair of tubular members being located coaxially with each other in the valve chamber so that said second cylindrical passages form a cylindrical guide way; and an elongated double valve member having a length shorter than the distance between said shoulders in said tubular members and having on either end a spherical end portion of a smaller diameter than the diameter of said second passages, and of a larger diameter than the diameter of said first cylindrical passages, said double valve member being located in said cylindrical guide way formed by said second cylindrical passages of said pair of tubular members, whereby, when said closure members are in said closing position, the fluid in the upstream conduit bearing against one of the spherical end portions of said elongated double valve member moves said double valve member with its other spherical end portion into sealing engagement with said valve seat in the tubular member associated with the downstream conduit so that the internal valve chamber is in communication with the upstream conduit to permit excess pressure in the internal valve chamber to escape to the upstream conduit.

WILLIAM BOYD.

REFERENCES CITED

The following references are of record in the file of this patent:

UNITED STATES PATENTS

| Number | Name | Date |
| --- | --- | --- |
| 537,750 | Cleaver | Apr. 16, 1895 |
| 869,525 | Schutte | Oct. 29, 1907 |
| 922,636 | Smith | May 25, 1909 |
| 1,049,478 | Hedgcock | Jan. 7, 1913 |
| 1,708,060 | Harrison et al. | Apr. 9, 1929 |

FOREIGN PATENTS

| Number | Country | Date |
| --- | --- | --- |
| 4,947 | Great Britain | of 1893 |
| 87,798 | Sweden | of 1936 |
| 232,161 | Great Britain | of 1925 |
| 446,311 | Australia | of 1936 |
| 608,130 | Belgium | of 1926 |